United States Patent
Tokumoto et al.

(10) Patent No.: US 6,935,195 B2
(45) Date of Patent: Aug. 30, 2005

(54) ROTATIONAL ANGLE DETECTING APPARATUS, TORQUE DETECTING APPARATUS AND STEERING APPARATUS

(75) Inventors: Yoshitomo Tokumoto, Nabari (JP); Naoki Maeda, Kashihara (JP); Mahito Shiba, Kashiwara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/388,734

(22) Filed: Mar. 13, 2003

(65) Prior Publication Data

US 2003/0192386 A1 Oct. 16, 2003

(30) Foreign Application Priority Data

Mar. 13, 2002 (JP) ....................................... 2002-069121

(51) Int. Cl.⁷ ............................................... G01L 3/02
(52) U.S. Cl. ................................................ 73/862.334
(58) Field of Search ...................... 73/862.328, 862.326, 73/862.325, 862.333, 862.334, 862.335, 862.08; 324/208, 207.13; 318/432, 488

(56) References Cited

U.S. PATENT DOCUMENTS

| | | | | |
|---|---|---|---|---|
| 4,774,464 A | * | 9/1988 | Kubota et al. | 324/207.25 |
| 4,874,053 A | * | 10/1989 | Kimura et al. | 324/207.21 |
| 4,939,435 A | * | 7/1990 | Takahashi et al. | 318/432 |
| 5,019,776 A | * | 5/1991 | Kawamata et al. | 324/207.12 |
| 5,239,490 A | * | 8/1993 | Masaki et al. | 73/862.08 |
| 6,536,293 B2 | * | 3/2003 | Shiba | 73/862.193 |
| 2002/0124663 A1 | * | 9/2002 | Tokumoto et al. | 73/862.233 |

FOREIGN PATENT DOCUMENTS

| | | |
|---|---|---|
| DE | 196 01 674 | 7/1997 |
| DE | 197 45 823 | 4/1999 |
| DE | 100 36 281 A1 | 2/2002 |
| EP | 1 035 002 | 9/2000 |

\* cited by examiner

*Primary Examiner*—Edward Lefkowitz
*Assistant Examiner*—T Miller
(74) *Attorney, Agent, or Firm*—Darby & Darby

(57) ABSTRACT

A rotational angle detecting apparatus wherein one or more first targets 3a are provided on a steering shaft 13 so that first detecting means 1A outputs a detection signal as the steering shaft 13 rotates, second detecting means 1B outputs a detection signal having a phase different from that of the detection signal of the first detecting means 1A, and the rotational angle of the steering shaft 13 is detected on the basis of the detection signals outputted by the first detecting means 1A and the second detecting means 1B. A rotational angle detecting apparatus further comprising second targets 3b, the number of which is prime to the number of the first targets 3a, provided on the steering shaft 13, third detecting means 3A, disposed opposite to the second targets 3b, for outputting a detection signal as the steering shaft 13 rotates, and fourth detecting means 3B for outputting a detection signal having a phase different from that of the detection signal of the third detecting means 3A, wherein the rotational angle of the steering shaft 13 is detected on the basis of the detection signals outputted by the first to fourth detecting means 1A, 1B, 3A and 3B, thereby being capable of detecting an absolute rotational angle.

20 Claims, 9 Drawing Sheets

ROTATIONAL ANGLE DETECTING APPARATUS, TORQUE DETECTING APPARATUS AND STEERING APPARATUS

BACKGROUND OF THE INVENTION

1. Field of the Invention

The present invention relates mainly to an automobile steering apparatus including a power steering apparatus using an electric motor and to a rotational angle detecting apparatus and a torque detecting apparatus therefor.

More particularly, the present invention relates to a rotational angle detecting apparatus wherein one or more targets are provided on a rotating member so that first detecting means outputs a detection signal as the rotating member rotates, second detecting means outputs a detection signal having a phase different from that of the detection signal of the first detecting means, and the rotational angle of the rotating member is detected on the basis of the detection signals outputted by the first detecting means and the second detecting means, to a torque detecting apparatus for detecting torque applied to a first shaft depending on a torsional angle generating in a connecting shaft for connecting the first shaft and a second shaft, and to a steering apparatus for generating a steering-assisting force on the basis of the detection result of the torque detecting apparatus.

2. Description of Related Art

The so called electric power steering apparatus wherein an electric motor is driven to assist steering in an automobile steering apparatus and to reduce a load on the driver is known. This apparatus comprises an input shaft connected to a steering wheel, an output shaft connected to wheels to be steered via a rack and a pinion and a connecting shaft for connecting the input shaft to the output shaft. In the apparatus, a torque detecting apparatus detects steering torque applied to the input shaft depending on a torsional angle generating in the connecting shaft, and a steering-assisting electric motor connected to the output shaft is driven and controlled on the basis of the steering torque detected by the torque detecting apparatus.

The applicant of this application in Japan has proposed, in U.S. Patent Publication No. US-2002-0124663-A1, a rotational angle detecting apparatus wherein one or more targets are provided on a rotating member so that first detecting means outputs a detection signal as the rotating member rotates, second detecting means outputs a detection signal having a phase different from that of the detection signal of the first detecting means, and the rotational angle of the rotating member is detected on the basis of the detection signals outputted by the first detecting means and the second detecting means; a torque detecting apparatus wherein the input shaft and the output shaft thereof are each provided with the rotational angle detecting apparatus, and torque applied to the input shaft is detected depending on a torsional angle generating in a connecting shaft for connecting the input shaft and the output shaft; and a steering apparatus for generating a steering-assisting force on the basis of the detection result of the torque detecting apparatus.

Since the above-mentioned rotational angle detecting apparatus cannot specify which target is detected by each of the detecting means, the apparatus detects only a relative rotational angle. The apparatus is sufficient to detect torque applied to the input shaft. However, the apparatus has a problem of being unable to detect an absolute rotational angle required to control the steering apparatus for generating a steering assisting force.

BRIEF SUMMARY OF THE INVENTION

Accordingly, the present invention is intended to provide a rotational angle detecting apparatus capable of detecting an absolute rotational angle, a torque detecting apparatus and a steering apparatus.

A rotational angle detecting apparatus in accordance with a first aspect comprises: rotating member; one or more first targets provided on the rotating member; first detecting means, disposed opposite to the first targets, for outputting a detection signal as the rotating member rotates; and second detecting means for outputting a detection signal having a phase different from that of the detection signal of the first detecting means, whereby the rotational angle of the rotating member is detected on the basis of the detection signals outputted by the first detecting means and the second detecting means, comprising: second targets, the number of which is prime to the number of the first targets, provided on the rotating member or other rotating members rotating coaxially with the rotating member; third detecting means, disposed opposite to the second targets, for outputting a detection signal as the rotating member rotates; and fourth detecting means for outputting a detection signal having a phase different from that of the detection signal of the third detecting means; wherein the rotational angle of the rotating member is detected on the basis of the detection signals outputted by the first detecting means, the second detecting means, the third detecting means and the fourth detecting means.

In this rotational angle detecting apparatus, as the rotating member rotates, the first detecting means and the second detecting means output detection signals having phases different from each other by using the first targets. As the rotating member rotates, the third detecting means and the fourth detecting means output detection signals having phases different from each other by using the second targets. The rotational angle of the rotating member is detected on the basis of the detection signals outputted from the first detecting means, the second detecting means, the third detecting means and the fourth detecting means, respectively.

Hence, the first detecting means, the second detecting means, the third detecting means and the fourth detecting means output sinusoidal detection signals respectively, whereby it is possible to realize a rotational angle detecting apparatus capable of detecting an absolute rotational angle.

A rotational angle detecting apparatus in accordance with a second aspect is characterized in that the first targets and the second targets are formed of convex portions provided at nearly equal intervals in the circumferential directions of the rotating members.

In this rotational angle detecting apparatus, as the rotating member rotates, the first detecting means, the second detecting means, the third detecting means and the fourth detecting means output the sinusoidal detection signals periodically by using the first targets or the second targets, whereby it is possible to realize a rotational angle detecting apparatus capable of detecting an absolute rotational angle.

A rotational angle detecting apparatus in accordance with a third aspect is characterized in that the first targets and the second targets are formed of non-concave portions provided between concave portions provided so that the non-concave portions are formed at nearly equal intervals in the circumferential directions of the rotating members.

In this rotational angle detecting apparatus, as the rotating member rotates, the first detecting means, the second detecting means, the third detecting means and the fourth detecting means output the sinusoidal detection signals periodically by using the first targets or the second targets, whereby it is possible to realize a rotational angle detecting apparatus capable of detecting an absolute rotational angle.

A rotational angle detecting apparatus in accordance with a fourth aspect is characterized in that the first targets and the second targets are provided with magnetic poles magnetized so as to be reversed alternately in polarity at nearly equal intervals in the circumferential directions of the rotating members.

In this rotational angle detecting apparatus, as the rotating member rotates, the first detecting means, the second detecting means, the third detecting means and the fourth detecting means output the sinusoidal detection signals periodically by using the first targets or the second targets, whereby it is possible to realize a rotational angle detecting apparatus capable of detecting an absolute rotational angle.

A torque detecting apparatus in accordance with a fifth aspect is characterized in that the rotational angle detecting apparatus as set forth in any one of first through fourth aspects is provided for a first shaft or a second shaft connected via a connecting shaft, the first targets, the first detecting means and the second detecting means are provided for the second shaft or the first shaft, and torque applied to the first shaft is detected on the basis of the difference between the detection signal outputted by the first detecting means or the second detecting means provided for the first shaft and the detection signal outputted by the first detecting means or the second detecting means provided for the second shaft depending on torsion generating in the connecting shaft.

In this torque detecting apparatus, the torque applied to the first shaft is detected on the basis of the difference between the detection signal outputted by using the first targets by the first detecting means or the second detecting means provided on the second shaft and the detection signal outputted by using the first targets by the first detecting means or the second detecting means provided on the first shaft depending on the torsion generating in the connecting shaft. It is thus possible to realize a torque detecting apparatus provided with a rotational angle detecting apparatus capable of detecting an absolute rotational angle.

A torque detecting apparatus in accordance with a sixth aspect is characterized in that the second targets provided in the rotational angle detecting apparatus are provided between the first targets provided on the first shaft and the first targets provided on the second shaft.

In this torque detecting apparatus, the second targets are provided between the first targets. Hence, even if the second targets are provided on either side of the first shaft or the second shaft, the arrangement positions of the first detecting means, the second detecting means, the third detecting means and the fourth detecting means can be determined so as to have one arrangement order, whereby the cost of producing the apparatus can be reduced.

A steering apparatus in accordance with a seventh aspect comprises a first shaft connected to a steering member: a second shaft connected to a steering mechanism; a connecting shaft for connecting the first shaft and the second shaft; and the torque detecting apparatus, as set forth in fifth or sixth aspect, for detecting steering torque applied to the first shaft on the basis of a torsional angle generating in the connecting shaft; whereby steering assisting is carried out depending on the steering torque detected by the torque detecting apparatus.

With this steering apparatus, the torque detecting apparatus, as set forth in fifth or sixth aspect, detects the steering torque applied to the first shaft on the basis of the torsional angle generating in the connecting shaft, and steering assisting is carried out depending on the detected steering torque, whereby it is possible to realize a steering apparatus provided with the torque detecting apparatus in accordance with the fifth or sixth aspect.

The above and further objects and features of the invention will more fully be apparent from the following detailed description with accompanying drawings.

DETAILED DESCRIPTION OF THE PREFERRED EMBODIMENTS

The present invention will be described below referring to the accompanying drawings showing embodiments thereof.

Figure 1:
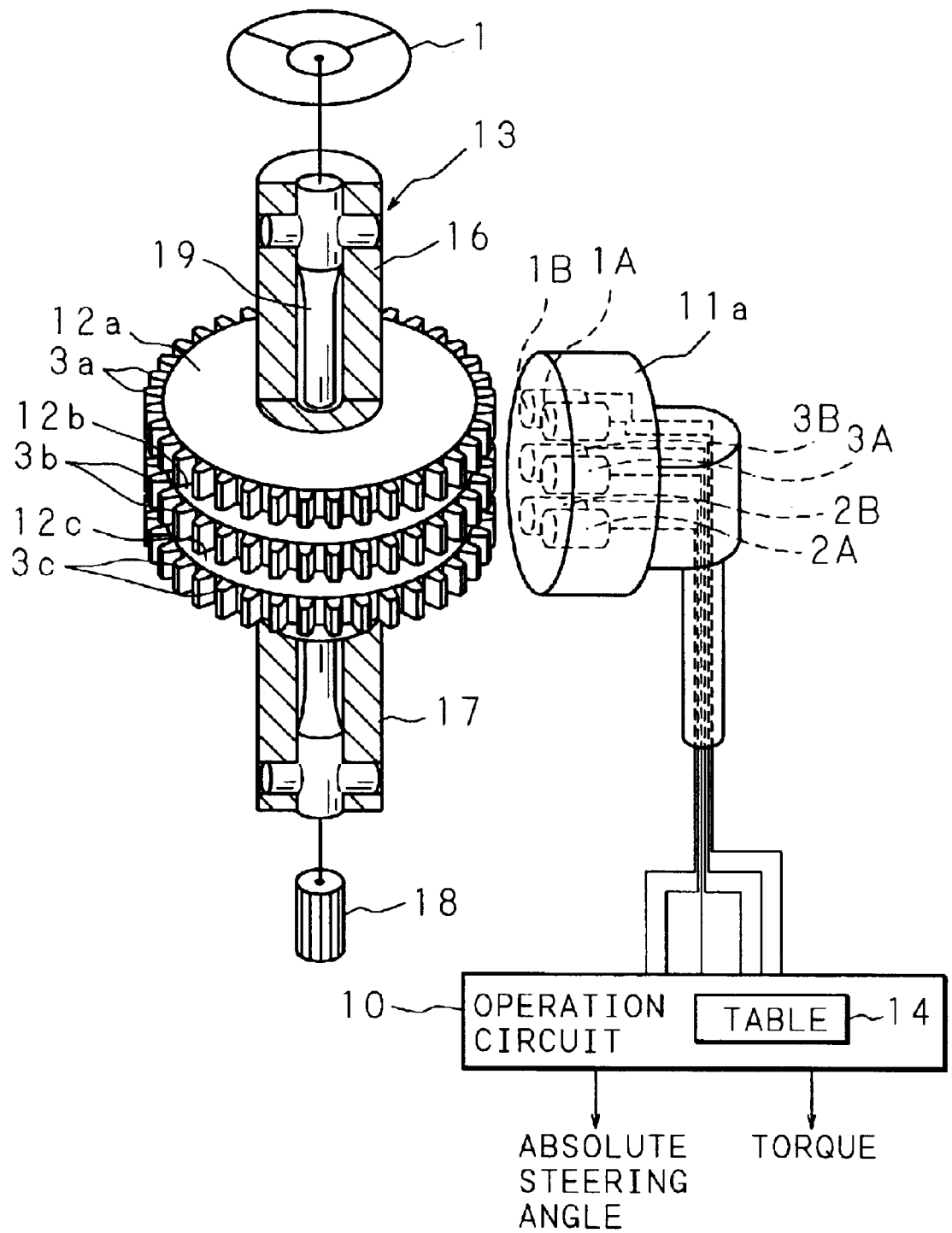
FIG. 1 is a schematic view showing the configurations of a rotational angle detecting apparatus, a torque detecting apparatus and a steering apparatus in accordance with an embodiment of the present invention.

FIG. 1 is a schematic view showing the configurations of a rotational angle detecting apparatus, a torque detecting apparatus and a steering apparatus in accordance with an embodiment of the present invention, mainly applied to automobiles, for example. In this steering apparatus, an input shaft 16 (a rotating member functioning as a first shaft) whose upper end portion is connected to a steering wheel 1 (a steering member) is coaxially connected to an output shaft 17 (a rotating member functioning as a second shaft) whose lower end portion is connected to a pinion 18 in a steering mechanism (not shown) via a torsion bar 19 (a connecting shaft) having a small diameter, whereby a steering shaft 13 for connecting the steering wheel 1 to the steering mechanism is formed. The configuration in the vicinity of the connecting portion between the input shaft 16 and the output shaft 17 is described below.

In the vicinity of an end portion of the connecting side of the input shaft 16 connected to the output shaft 17, disc-shaped target plates 12a and 12b are coaxially fitted on the input shaft 16 and secured thereto with the target plate 12a (a rotating member) disposed on the side of the steering wheel 1. On the outer circumferential face of the target plate 12a, a plurality of targets 3a (first targets), which are convex portions made of a magnetic material, 36 pieces for example, are provided at equal intervals so as to protrude in the circumferential direction. On the outer circumferential face of the target plate 12b (another rotating member), a plurality of targets 3b (second targets), which are convex portions made of a magnetic material, are provided at equal intervals so as to protrude in the circumferential direction. The number of the targets 3b is for example 37, a number being prime to the number of the targets 3a. The fact that two numbers are prime to each other means that they do not have any common divisors other than one.

The targets 3a and 3b are formed of the teeth of spur gears having involute teeth, and the circular spur gears are used to form the target plates 12a and 12b and the targets 3a and 3b.

In the vicinity of an end portion of the connecting side of the output shaft 17 connected to the input shaft 16, a target plate 12c (a rotating member) provided with 36 targets 3c (first targets) similar to the above-mentioned targets 3a is also fitted on the output shaft 17 and secured thereto. The targets 3c of the target plate 12c on the side of the output shaft 17 and the targets 3a of the target plate 12a on the side of the input shaft 16 are aligned in the circumferential direction and provided in parallel.

The teeth serving as the targets 3a, 3b and 3c may be formed by gear cutting the circumferential faces of the input shaft 16 and the output shaft 17 made of a magnetic material.

Outside the target plates 12a, 12b and 12c, a sensor box 11a is disposed so as to face the outer fringes of the targets 3a, 3b and 3c on the outer circumferential faces of the target plates, respectively. The sensor box 11a is secured to and supported by a stationary portion, such as a housing (not shown), for rotatably supporting the input shaft 16 and the output shaft 17. Magnetic sensors 1A and 1B (first detecting means and second detecting means) disposed at different positions opposite to each other in the circumferential direction of the targets 3a on the side of the input shaft 16 and the magnetic sensors 2A and 2B (first detecting means and second detecting means) disposed at different positions opposite to each other in the circumferential direction of the targets 3c on the side of the output shaft 17 are correctly aligned in the circumferential direction and contained inside the sensor box 11a. In addition, magnetic sensors 3A and 3B (third detecting means and fourth detecting means) disposed at different positions opposite to each other in the circumferential direction of the targets 3b on the side of the input shaft 16 are also contained therein.

The magnetic sensors 1A, 1B, 2A, 2B, 3A and 3B are formed of a device having an electrical characteristic resistance) changing depending on magnetic field action, such as a magnetoresistance effect device (an MR device), and configured so that their detection signals change depending on the portions of the targets 3a, 3c and 3b disposed close and opposite thereto. The detection signals of these magnetic sensors 1A, 1B, 2A, 2B, 3A and 3B are supplied to an operation circuit 10 comprises a microprocessor provided inside or outside the sensor box 11a.

The operation circuit 10 includes a table 14 in which the rotational angle of the input shaft 16 at the time of its rotation and the previously measured detection signal values of the magnetic sensors 1A, 1B, 3A and 3B are stored so as to have correspondence therebetween.

The magnetic sensors 1A, 1B, 2A, 2B, 3A and 3B output detection signals having waveforms similar to triangular or sinusoidal waveforms as the targets 3a, 3c and 3b pass by. The nonlinear change rate of each of the detection signals is maximized in the vicinity of a turning point from rising to lowering or from lowering to rising. However, interpolation can be carried out by using a signal processing method described below.

The operations of the rotational angle detecting apparatus and the torque detecting apparatus having the above-mentioned configurations will be described below.

Figure 2A:
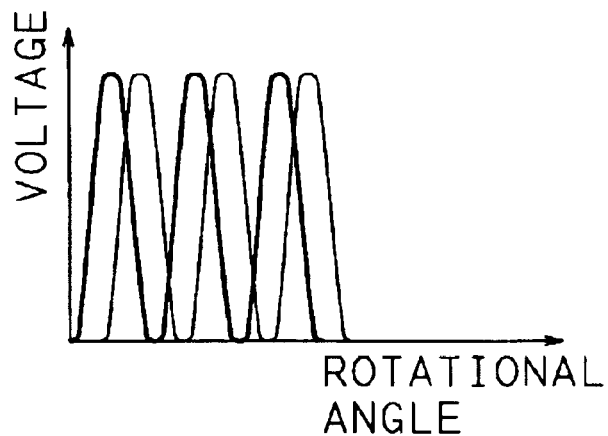
FIG. 2A, FIG. 2B and FIG. 2C are waveforms showing examples of the detection signals of magnetic sensors.
Figure 2B:
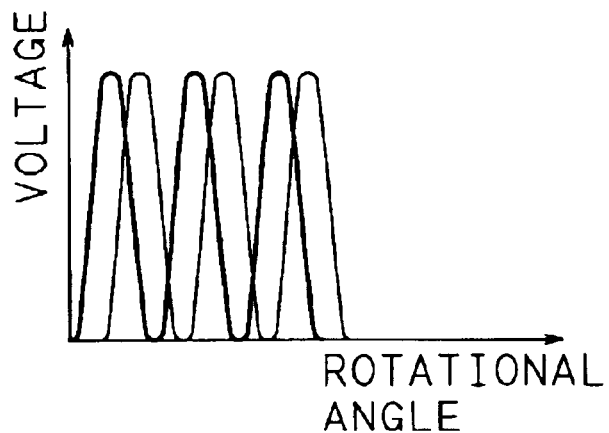
Figure 2C:
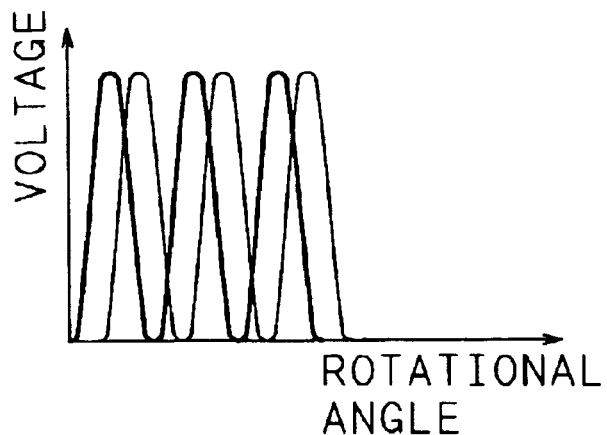

The magnetic sensors 1A, 1B, 2A, 2B, 3A and 3B output detection signals rising and lowering depending on the change in the rotational angle of each of the input shaft 16 and the output shaft 17 as shown in FIG. 2A, FIG. 2B and FIG. 2C, respectively, while the targets 3a, 3c and 3b pass by the positions opposite to the corresponding sensors, respectively.

The detection signals of the magnetic sensors 1A and 1B correspond to the rotational angle of the input shaft 16 provided with the targets 3a disposed opposite to these magnetic sensors. The detection signals of the magnetic sensors 3A and 3B correspond to the rotational angle of the input shaft 16 provided with the targets 3b disposed opposite to these magnetic sensors. The detection signals of the magnetic sensors 2A and 2B correspond to the rotational angle of the output shaft 17 provided with the targets 3c disposed opposite to these magnetic sensors.

Hence, the operation circuit 10 can calculate the relative rotational angle of the input shaft 16 from the detection signals of the magnetic sensors 1A and 1B, whereby the operation circuit 10 and the magnetic sensors 1A and 1B operate as a rotational angle detecting apparatus for the input shaft 16. In addition, the operation circuit 10 can calculate the relative rotational angle of the output shaft 17 from the detection signals of 10 the magnetic sensors 2A and 2B, whereby the operation circuit 10 and the magnetic sensors 2A and 2B operate as a rotational angle detecting apparatus for the output shaft 17.

When a torque is applied to the input shaft 16, a difference occurs between each of the detection signals of the magnetic sensors 1A and 1B and each of the detection signals of the magnetic sensors 2A and 2B.

The magnetic sensors 1A and 2A are different in phase from the magnetic sensors 1B and 2B by an electrical angle of 90°, for example, in the circumferential directions of the target plates 12a and 12c, respectively. The nonlinear change rate of each of the detection signals is maximized at maximal and minimal values as turning points of rising and lowering. Because of the difference in phase, interpolation is possible with each other. In the case when interpolation is possible, the difference in phase may be any electrical angle of 1° to less than 360°.

The difference between the detection signal of the magnetic sensor 1A and the detection signal of the magnetic sensor 2A or the difference between the detection signal of the magnetic sensor 1B and the detection signal of the magnetic sensor 2B corresponds to the difference (relative angle displacement) between the rotational angle of the input shaft 16 and the rotational angle of the output shaft 17. This relative angle displacement corresponds to a torsional angle generating in a torsion bar 19 connected between the input shaft 16 and the output shaft 17 when torque is applied to the input shaft 16. As a result, the torque applied to the input shaft 16 can be calculated on the basis of the difference between the above-mentioned detection signals.

Furthermore, just like the magnetic sensors 1A and 1B, the magnetic sensors 3A and 3B are different in phase from each other by an electrical angle of 90° in the circumferential direction of the target plate 12b. Although the number of the targets 3a disposed opposite to the magnetic sensors 1A and 1B is 36, the number of the targets 3b disposed opposite to the magnetic sensors 3A and 3B is 37. Hence, each time the input shaft 16 rotates by one phase amount, the phases of the detection signals outputted from the magnetic sensors 1A and 3A and the phases of the detection signals outputted from the magnetic sensors 1B and 3B are displaced from each other by a 1/37 phase amount as shown in FIG. 3.

Figure 3:
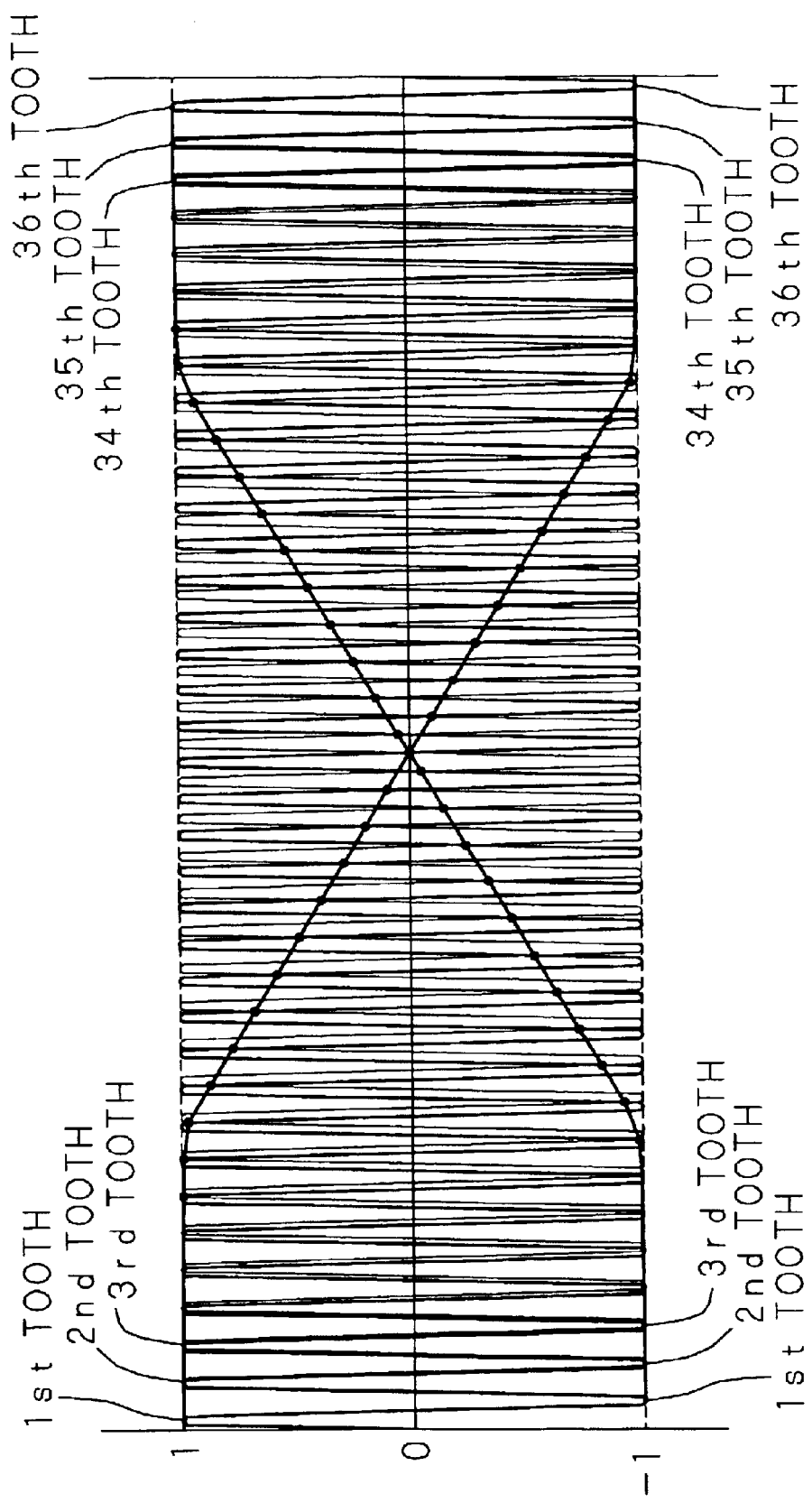
FIG. 3 is a waveform showing examples of the detection signals of magnetic sensors, the number of targets disposed opposite to one magnetic sensor being different from the number of targets disposed opposite to the other magnetic sensor.

In the case when only the magnetic sensors 1A and 3A or only the magnetic sensors 1B and 3B are used, one set of the same detection signal values generates twice while the input shaft 16 rotates 360° as shown in FIG. 3. Hence, the rotational angle (absolute rotational angle) of the input shaft 16 cannot be specified. However, the rotational angle of the input shaft 16 can be specified by referring to the detection signal values of the magnetic sensors 1A, 3A, 1B and 3B stored in the table 14.

In addition, the number of the targets disposed opposite to the magnetic sensors 3A and 3B serving as absolute angle (detection) sensors is different from the number of the targets disposed opposite to the magnetic sensors 1A and 1B serving as input (shaft) relative angle (detection) sensors and the number of the magnetic sensors 2A and 2B serving as output (shaft) relative angle (detection) sensors. Hence, the arrangement interval of the magnetic sensors 3A and 3B is different from that of the magnetic sensors 1A and 1B and that of the magnetic sensors 2A and 2B.

In the case when an absolute rotational angle is detected, the absolute rotational angle of the input shaft 16 or the absolute rotational angle of the output shaft 17 is detected depending on the type of vehicle to which the steering apparatus is applied.

Figure 4A:
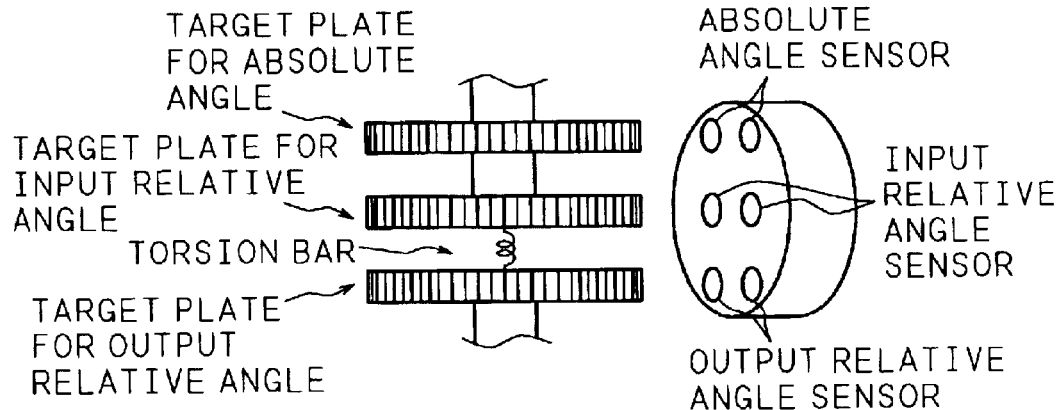
FIG. 4A, FIG. 4B and FIG. 4C are views explaining the arrangement examples of target plates for absolute angle (detection), target plates for input (shaft) relative angle (detection) and target plates for output (shaft) relative angle (detection)

In the case of the steering apparatus for detecting the absolute rotational angle of the input shaft 16, a target plate for absolute angle (detection), such as the target plate 12b, and a target plate for input (shaft) relative angle (detection), such as the target plate 12a, can be arranged on the input shaft 16 in this order from above, and a target plate for output (shaft) relative angle (detection), such as the target plate 12c, can be arranged on the output shaft 17, as shown in a schematic view of FIG. 4A.

Figure 4B:
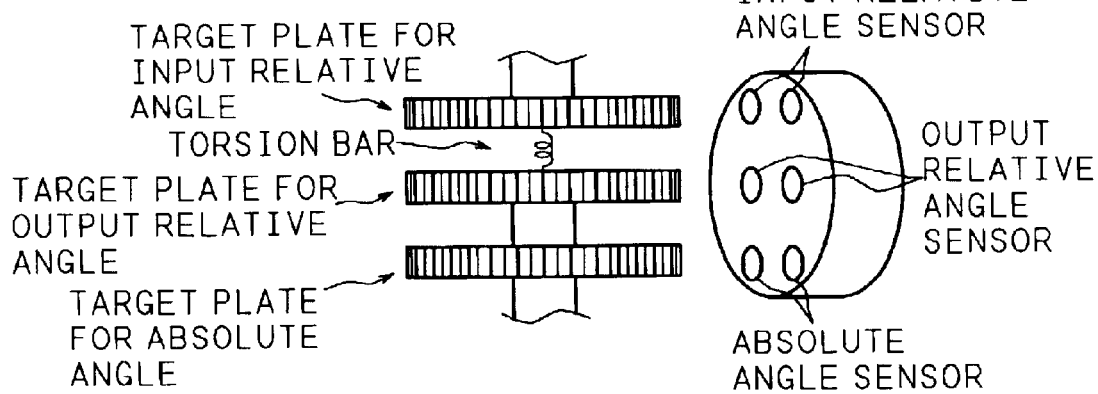

In the case of the steering apparatus for detecting the absolute rotational angle of the output shaft 17, the target plate for input (shaft) relative angle (detection) can be arranged on the input shaft 16, and the target plate for output (shaft) relative angle (detection) and the target plate for absolute angle (detection) can be arranged on the output shaft 17 in this order from above, as shown in a schematic view of FIG. 4B.

However, if the target plates are arranged as shown in the schematic views of FIG. 4A and FIG. 4B, the arrangement positions of the absolute angle (detection) sensors in a sensor box, such as the sensor box 11a, must be changed up and down in each of the above-mentioned arrangement cases. It is thus necessary to produce two kinds of sensor boxes.

Figure 4C:
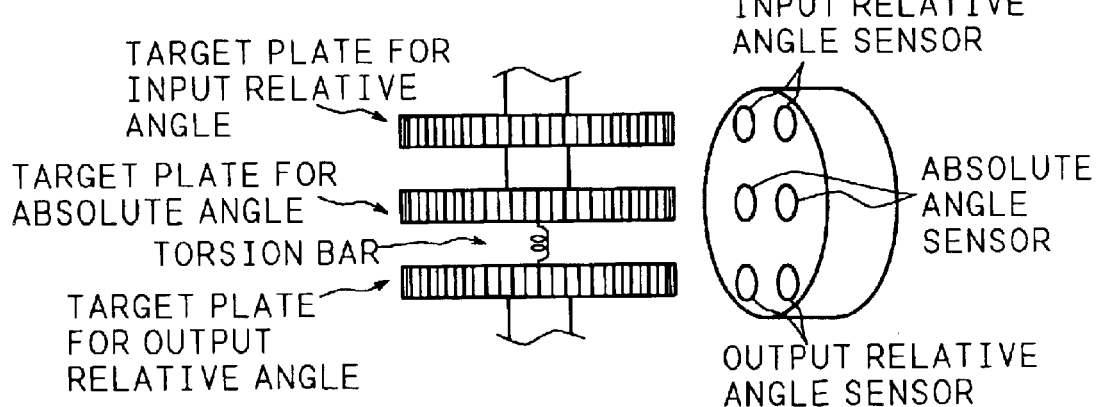

Furthermore, in the case of the steering apparatus for detecting the absolute rotational angle of the input shaft 16, the target plate for input (shaft) relative angle (detection) and the target plate for absolute angle (detection) can be arranged on the input shaft 16 in this order from above, and the target plate for output (shaft) relative angle (detection) can be arranged on the output shaft 17, as shown in a schematic view of FIG. 4C.

Moreover, in the case of the steering apparatus for detecting the absolute rotational angle of the output shaft 17, the target plate for input (shaft) relative angle (detection) can be arranged on the input shaft 16, and the target plate for absolute angle (detection) and the target plate for output (shaft) relative angle (detection) can be arranged on the output shaft 17 in this order from above.

In any of the above-mentioned cases, by arranging the target plate for input (shaft) relative angle (detection), the target plate for absolute angle (detection) and the target plate for output (shaft) relative angle (detection) in this order from above so that the target plate for absolute angle (detection) is provided between the two target plates for relative angle (detection), it is not necessary to change the arrangement positions of the absolute angle (detection) sensors in the sensor box, whereby only one kind of sensor box is required to be produced.

The above-mentioned targets are not particularly limited in configuration, provided that the detection signals of the magnetic sensors change as the target plates (rotating members) rotate. For example, the target plates 12a, 12b and 12c can also have a configuration wherein convex portions are formed at nearly equal intervals in the circumferential directions thereof so that the distance between each of the magnetic sensors and the convex portions close thereto changes as the target plates 12a, 12b and 12c rotate. By providing the convex portions on the outer circumferences of the target plates 12a, 12b and 12c, the rotational angle (absolute rotational angle) and the torque of the input shaft 16 can be detected, just as in the case of the above-mentioned gear-type target plates.

Figure 5:
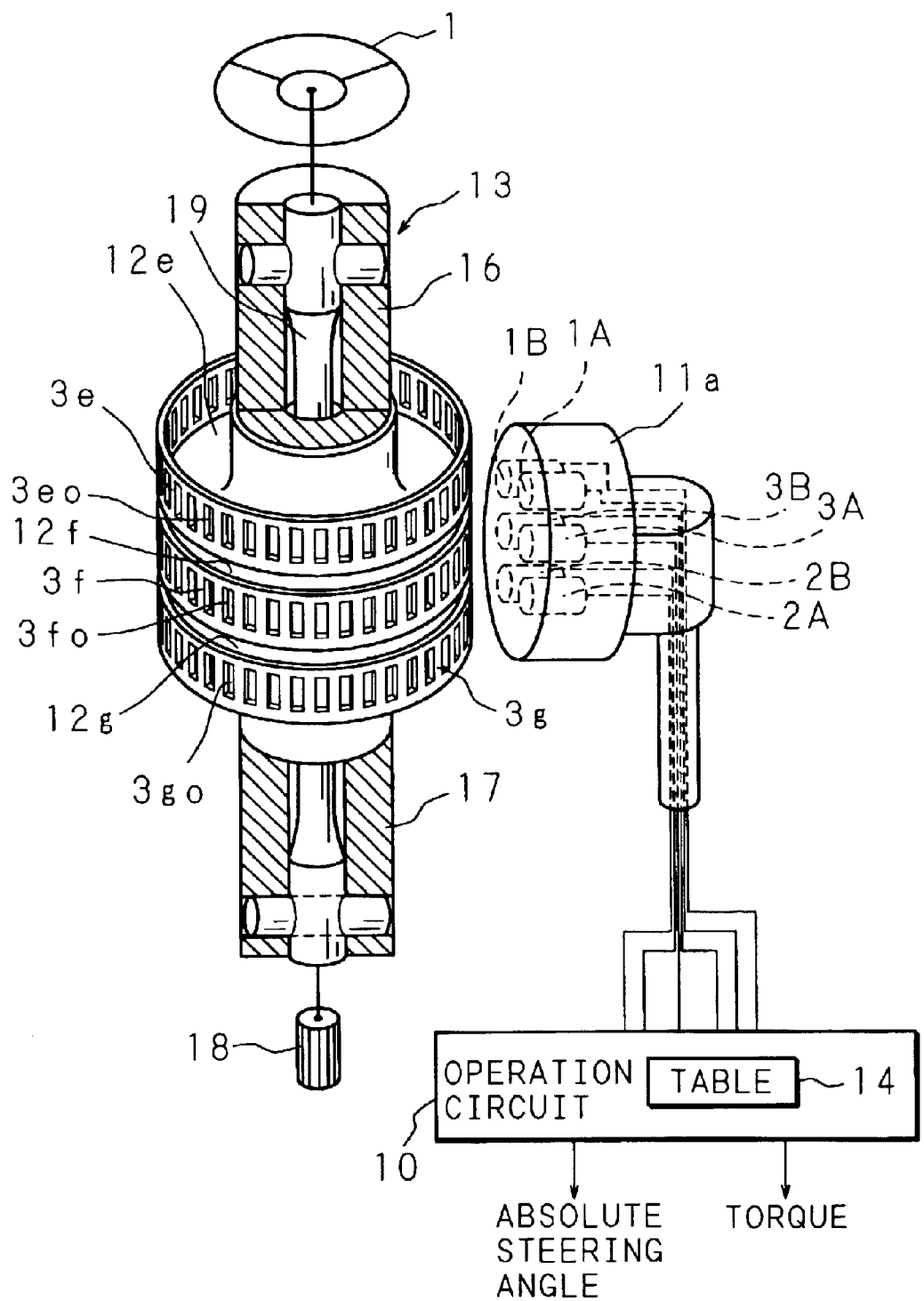
FIG. 5 is a schematic view showing the configurations of a rotational angle detecting apparatus, a torque detecting apparatus and a steering apparatus in accordance with another embodiment of the present invention.

Furthermore, instead of the target plates 12a, 12b and 12c, it is also possible to use target plates 12e, 12f and 12g provided with concave portions 3eo, 3fo and 3go, respectively, so as to form non-concave portions 3e, 3f and 3g at nearly equal intervals in the circumferential directions of the outer circumferential surfaces of the target plate as shown in FIG. 5. In this embodiment, the concave portions 3eo, 3fo and 3go are through holes.

Since the non-concave portions 3e, 3f and 3g and the concave portions 3eo, 3fo and 3go alternately become close to the magnetic sensors 1A, 1B, 3A, 3B, 2A and 2B, respectively, the distance between each of the magnetic sensors 1A, 1B, 3A, 3B, 2A and 2B and the corresponding non-concave portions 3e, 3f and 3g or the corresponding concave portions 3eo, 3fo and 3go changes respectively. As a result, detection signals having sinusoidal or triangular waveforms are outputted. It is thus possible to detect the rotational angle and torque, just as in the case of the rotational angle detecting apparatus and the torque detecting apparatus shown in the above-mentioned FIG. 1.

Figure 6:
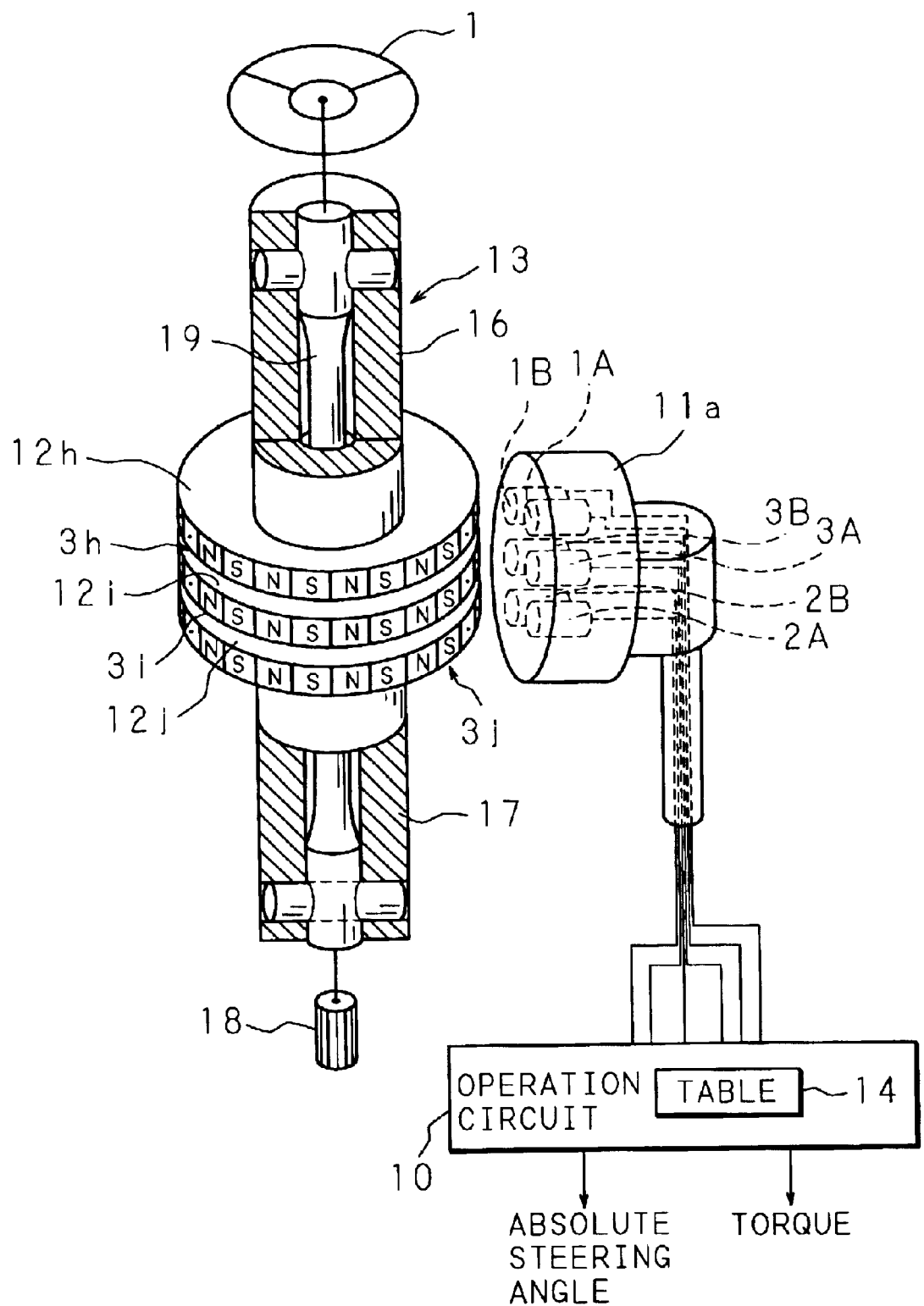
FIG. 6 is a schematic view showing the configurations of a rotational angle detecting apparatus, a torque detecting apparatus and a steering apparatus in accordance with still another embodiment of the present invention.

In addition, instead of the target plates 12a, 12b and 12c, it is also possible to use target plates 12h, 12i and 12j whose outer circumferential surfaces 3h, 3i and 3j are magnetized so as to be reversed alternately in polarity at nearly equal intervals in the circumferential directions thereof as shown in FIG. 6. Since the magnetic poles close to the magnetic sensors 1A, 1B, 3A, 3B, 2A and 2B are reversed alternately in polarity, positive/negative (NS), as the target plates 12h, 12i and 12j rotate, the intensity of the magnetic field detected depending on the change in the distance between each of the magnetic sensors 1A, 1B, 3A, 3B, 2A and 2B and the magnetic poles close thereto is changed. As a result, detection signals having sinusoidal or triangular waveforms are outputted. It is thus possible to detect the rotational angle and torque, just as in the case of the rotational angle detecting apparatus and the torque detecting apparatus shown in the above-mentioned FIG. 1.

Another Embodiment 1

Figure 7:
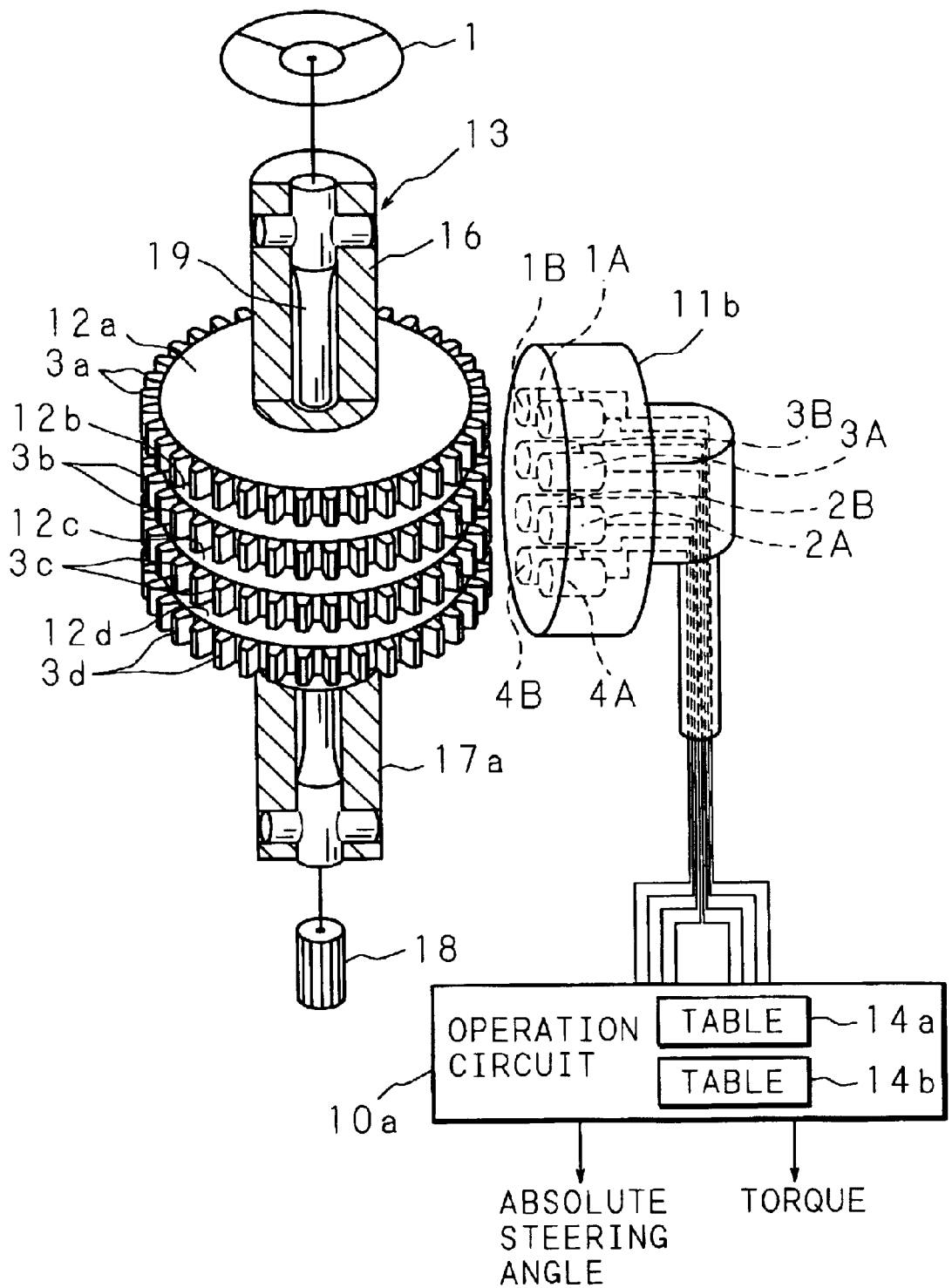
FIG. 7 is a schematic view showing the configurations of a torque detecting apparatus and a steering apparatus in accordance with yet still another embodiment.

FIG. 7 is a schematic view showing the configurations of a rotational angle detecting apparatus, a torque detecting apparatus and a steering apparatus in accordance with another embodiment. In this steering apparatus, target plates 12c and 12d are fitted coaxially on the output shaft 17 of the torque detecting apparatus and the steering apparatus described in FIG. 1 and secured thereto with the target plate 12c disposed on the side of the steering wheel 1, whereby an output shaft 17a is formed. On the outer circumferential surface of the target plate 12d, a plurality of targets 3d, which are convex portions made of a magnetic material, 37 pieces for example, protrude at equal intervals in the circumferential direction.

The targets 3c of the target plate 12c on the side of the output shaft 17a and the targets 3a of the target plate 12a on the side of the input shaft 16 are aligned in the circumferential direction and provided in parallel.

The number of the targets 3c (teeth) is different from the number of the targets 3d (teeth) by one.

Outside the target plates 12a, 12b, 12c and 12d, a sensor box 11b is disposed so as to face the outer fringes of the targets 3a, 3b, 3c and 3d formed on the outer circumferences of the target plates, respectively. The sensor box 11b is secured to and supported by a stationary portion, such as a housing, for rotatably supporting the input shaft 16 and the output shaft 17a. The magnetic sensors 1A and 1B disposed at different positions opposite to each other in the circumferential direction of the targets 3a and the magnetic sensors 3A and 3B disposed at different positions opposite to each other in the circumferential direction of the targets 3b on the side of the input shaft 16, and the magnetic sensors 2A and 2B disposed at different positions opposite to each other in the circumferential direction of the targets 3c and the magnetic sensors 4A and 4B disposed at different positions opposite to each other in the circumferential direction of the targets 3d on the side of the output shaft 17a are correctly aligned to the corresponding respective circumferential positions and contained inside the sensor box 11b.

The magnetic sensors 4A and 4B are similar to the magnetic sensors 1A and 1B. The detection signals of the magnetic sensors 1A, 1B, 2A, 2B, 3A, 3B, 4A and 4B are supplied to an operation circuit 10a comprises a microprocessor provided inside or outside the sensor box 11b.

The operation circuit 10a includes a table 14a (identical to the table 14 of FIG. 1) in which the rotational angle of the input shaft 16 at the time of its rotation and the measured detection signal values of the magnetic sensors 1A, 1B, 3A and 3B are stored so as to have correspondence therebetween. The operation circuit 10a also includes a table 14b in which the rotational angle of the output shaft 17a at the time of its rotation and the measured detection signals values of the magnetic sensors 2A, 2B, 4A and 4B are stored so as to have correspondence therebetween.

The magnetic sensors 1A, 1B, 2A, 2B, 3A, 3B, 4A and 4B output detection signals having waveforms similar to triangular or sinusoidal waveforms as the targets 3a, 3c, 3b and 3d pass by. The other configurations of this steering apparatus are similar to those of the steering apparatus described in FIG. 1. Hence, the same elements are designated by the same reference numerals, and their explanations are omitted.

The operations of the rotational angle detecting apparatus, the torque detecting apparatus and the steering apparatus having the above-mentioned configurations will be described below.

The magnetic sensors 1A, 1B, 2A, 2B, 3A, 3B, 4A and 4B output detection signals rising and lowering depending on the change in the rotational angle of each of the input shaft 16 and the output shaft 17a as shown in FIG. 2A, while the targets 3a, 3c, 3b and 3d pass by the positions opposite to the corresponding sensors.

The detection signals of the magnetic sensors 4A and 4B correspond to the rotational angle of the output shaft 17a provided with the targets 3d disposed opposite to these magnetic sensors.

Furthermore, just like the magnetic sensors 2A and 2B, the magnetic sensors 4A and 4B are different in phase from each other by an electrical angle of 90° in the circumferential direction of the target plate 12d. Although the number of the targets 3c disposed opposite to the magnetic sensors 2A and 2B is 36, the number of the targets 3d disposed opposite to the magnetic sensors 4A and 4B is 37. Hence, each time the input shaft 16 rotates by one phase amount, the phases of the detection signals outputted from the magnetic sensors 2A and 4A and the phases of the detection signals outputted from of the magnetic sensors 2B and 4B are displaced from each other by a 1/37 phase amount as shown in FIG. 3.

In the case when only the magnetic sensors 2A and 4A or only the magnetic sensors 2B and 4B are used, one set of the same detection signal values generates twice while the input shaft 16 rotates 360° as shown in FIG. 3. Hence, the rotational angle (absolute rotational angle) of the input shaft 16 cannot be specified. However, the rotational angle of the input shaft 16 can be specified by referring to the detection signal values of the magnetic sensors 2A, 4A, 2B and 4B stored in the table 14b. The other operations of the rotational angle detecting apparatus, the torque detecting apparatus and the steering apparatus are similar to those of the rotational angle detecting apparatus, the torque detecting apparatus and the steering apparatus described in FIG. 1. Hence, the same elements are designated by the same reference numerals, and their explanations are omitted.

When the magnetic sensors 1A, 1B, 2A, 2B, 3A, 3B, 4A and 4B, that is eight channels, are used as described above, and if one or both of the channels 1A and 1B become faulty, the faulty channels 1A and/or 1B are specified, and the torque can be detected by the channels 3A, 3B, 4A and 4B, and the rotational angle (absolute rotational angle) can be detected by the channels 2A, 2B, 4A and 4B normally and continuously at all times.

In other words, even if any one of the eight channels, i.e., the eight magnetic sensors, becomes faulty, the steering apparatus operates without problems, and the fault can be notified (a diagnosis signal is outputted), and the absolute rotational angle of the input shaft or the output shaft can be detected continuously.

Another Embodiment 2

Figure 8:
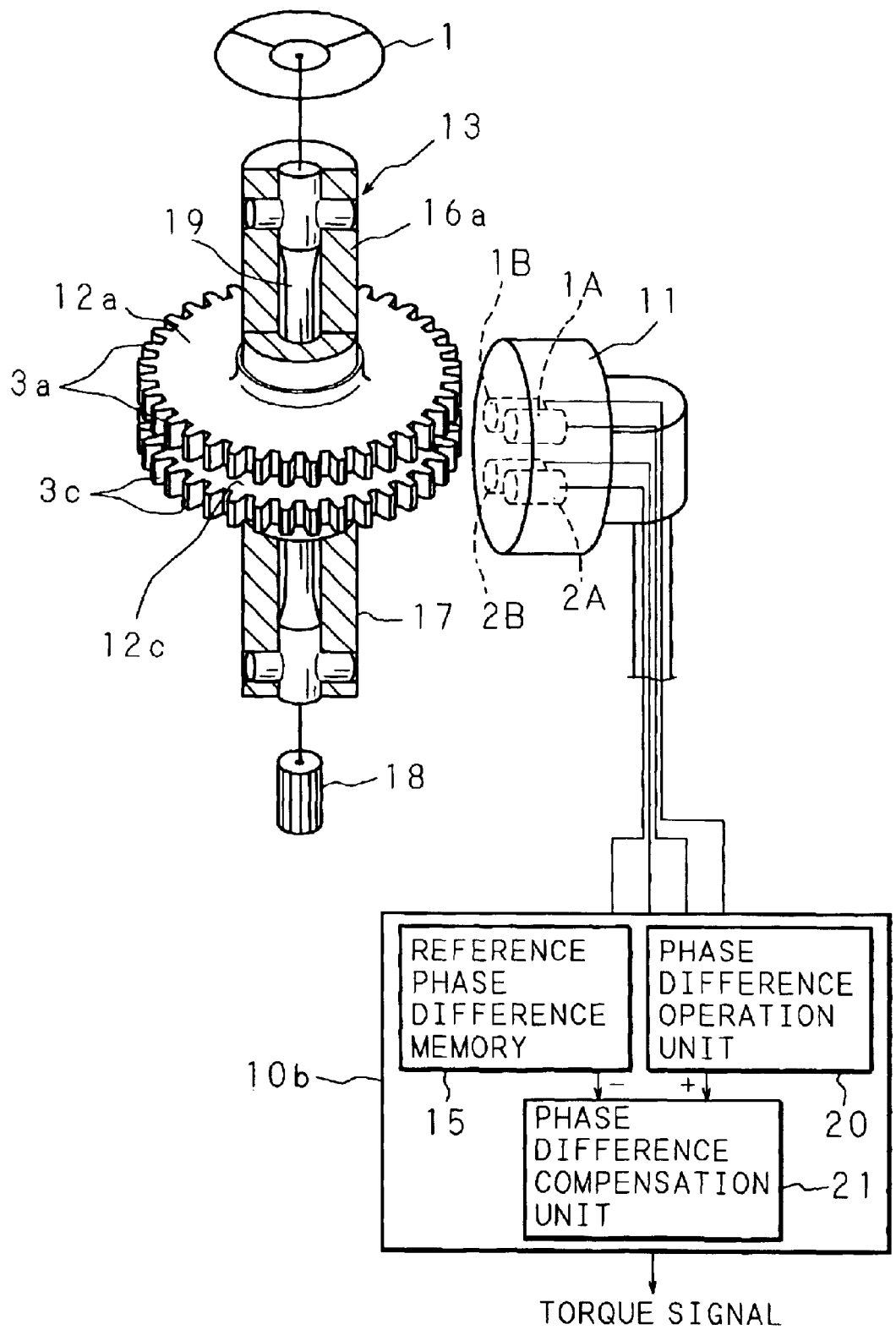
FIG. 8 is a schematic view showing the configurations of a torque detecting apparatus and a steering apparatus in accordance with a further embodiment.

FIG. 8 is a schematic view showing the configurations of a torque detecting apparatus and a steering apparatus in accordance with still another embodiment. In the torque detecting apparatus and the steering apparatus, the target plate 12b is eliminated from the input shaft 16 of the rotational angle detecting apparatus, the torque detecting apparatus and the steering apparatus described in FIG. 1, whereby an input shaft 16a is formed.

Outside the target plates 12a and 12c, a sensor box 11 is disposed so as to face the outer fringes of the targets 3a and 3c on the outer circumferences of the target plates 12a and 12c, respectively. The sensor box 11 is secured to and supported by a stationary portion, such as a housing, for rotatably supporting the input shaft 16a and the output shaft 17. The magnetic sensors 1A and 1B disposed at different positions opposite to each other in the circumferential direction of the targets 3a on the side of the input shaft 16a and the magnetic sensors 2A and 2B disposed at different positions opposite to each other in the circumferential direction of the targets 3c on the side of the output shaft 17 are correctly aligned in the corresponding respective circumferential directions and contained inside the sensor box 11.

The detection signals of the magnetic sensors 1A, 1B, 2A and 2B are supplied to an operation circuit 10b comprises a microprocessor provided inside or outside the sensor box 11.

The operation circuit 10b is provided with a reference phase difference memory 15 for storing the displacement of the phase difference between the targets 3a and 3c at the time when the torsion of the torsion bar 19 measured during assembly is zero, a phase difference operation unit 20 for operating the phase difference between the targets 3a and 3c on the basis of the detection signals of the magnetic sensors 1A, 1B, 2A and 2B, and a phase difference compensation unit 21 for compensating for the phase difference between the targets 3a and 3c on the basis of the phase difference operated by the phase difference operation unit 20 and the displacement of the phase difference stored in the reference phase difference memory 15. The operation circuit 10b outputs a torque signal based on the phase difference compensated for by the phase difference compensation unit 21. The other configurations of the torque detecting apparatus and the steering apparatus are similar to those of the torque detecting apparatus and the steering apparatus described in to FIG. 1. Hence, the same elements are designated by the same reference numerals, and their explanations are omitted.

The operations of the torque detecting apparatus and the steering apparatus having the above-mentioned configurations will be described below.

Figure 9A:
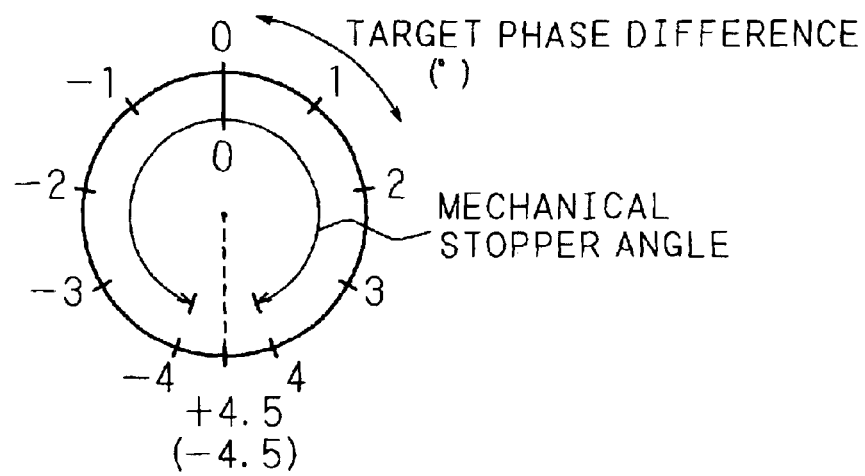
FIG. 9A, FIG. 9B and FIG. 9C are views explaining the torque detecting apparatus and the steering apparatus in accordance with the farther embodiment.

In the case when the number of the teeth, i.e., the targets 3a and 3c, is 40 (9° for one period), for example, and when the left/right torsional angles (mechanical stopper angles) of the torsion bar 19 are ±4°, for example, no difference occurs between the left/right torque values as shown in FIG. 9A, provided that no error is present in the assembly of the target plates 12a and 12c and the input/output shafts 16a and 17.

Since one period corresponds to 9°, a torsional angle of +4.5° and a torsional angle of −4.5° are the same as phase difference signals. Furthermore, a torsional angle of −4° and a torsional angle of +5° are also the same as phase difference signals.

For example, in the case when an assembly error is present between the target plates 12a and 12c (an error of 1°, for example) and when the torsion bar 19 is pinned and secured to the input shaft 16a and the output shaft 17 so that the phase difference between the input shaft 16a and the output shaft 17 becomes zero, a deviation occurs in the phase difference (torque) between the targets 3a and 3c.

Figure 9B:
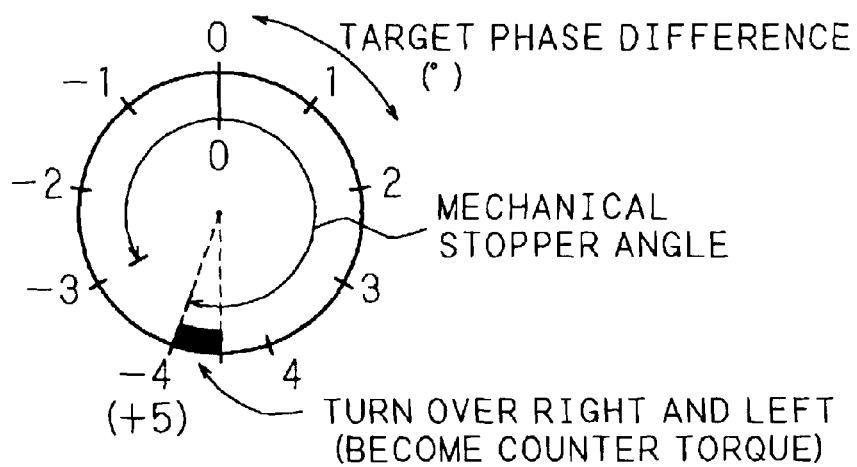

When the deviations are −3° and +5° as shown in FIG. 9B, right/left turnover of torque occurs (a counter torque generates) in the range of +4.5° to +5°. In other words, it is impossible to distinguish between α° and (9+α)°.

Figure 9C:
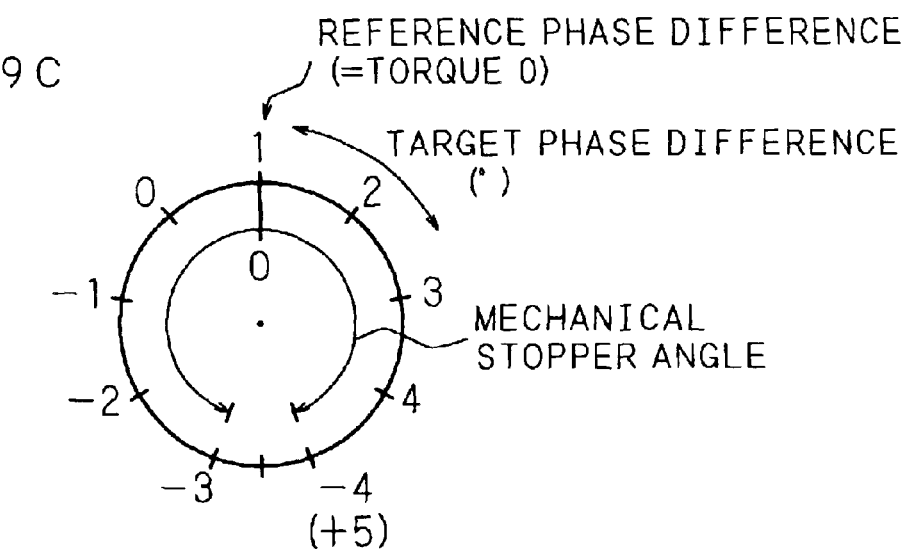

To solve this problem, while the displacement (1°, for example) (the assembly error between the target plates 12a and 12c) of the phase difference between the targets 3a and 3c is unchanged as shown in FIG. 9C, pinning is carried out at the neutral point of a mechanical stopper, the displacement of the phase difference between the targets 3a and 3c is measured, and the phase difference is stored in the reference phase difference memory 15.

During operation, the phase difference operation unit 20 performs an operation to obtain the phase difference between the targets 3a and 3c on the basis of the detection signals of the magnetic sensors 1A, 1B, 2A and 2B. Furthermore, the phase difference compensation unit 21 compensates for the phase difference obtained by the operation on the basis of the displacement of the phase difference stored in the reference phase difference memory 15 and outputs a torque signal based on the compensated phase difference.

As a result, it is possible to ignore the displacement of the phase difference between the targets 3a and 3c (the assembly error between the target plates 12a and 12c). In addition, the range of torque detection is expanded, any mechanical phase difference is eliminated, phase alignment work is not necessary, and the number of targets (teeth) is not required to be reduced, thereby being advantageous in resolution and accuracy.

The other operations of the torque detecting apparatus and the steering apparatus are similar to those (except the operation for detecting the absolute steering angle) of the torque detecting apparatus and the steering apparatus described in to FIG. 1. Hence, the same elements are designated by the same reference numerals, and their explanations are omitted.

With the rotational angle detecting apparatus in accordance with the first aspect, the first detecting means, the second detecting means, the third detecting means and the fourth detecting means output sinusoidal detection signals respectively, whereby it is possible to realize a rotational angle detecting apparatus capable of detecting an absolute rotational angle.

With the rotational angle detecting apparatuses in accordance with the second and third aspects, it is possible to realize rotational angle detecting apparatuses capable of detecting an absolute rotational angle.

With the rotational angle detecting apparatus in accordance with the fourth aspect, as the rotating members rotate, the first detecting means, the second detecting means, the third detecting means and the fourth detecting means output the sinusoidal detection signals periodically, whereby it is possible to realize a rotational angle detecting apparatus capable of detecting an absolute rotational angle.

With the torque detecting apparatus in accordance with the fifth aspect, it is possible to realize a torque detecting apparatus provided with a rotational angle detecting apparatus capable of detecting an absolute rotational angle.

With the torque detecting apparatus in accordance with the sixth aspect, even if the second targets are provided on either side of the first shaft or the second shaft, the arrangement positions of the first detecting means, the second detecting means, the third detecting means and the fourth detecting means can be determined so as to have one arrangement order, whereby the cost of producing the apparatus can be reduced.

With the steering apparatus in accordance with the seventh aspect, it is possible to realize a steering apparatus provided with the torque detecting apparatus in accordance with the fifth or sixth aspect.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds there-of are therefore intended to be embraced by the claims.

What is claimed is:

1. A rotational angle detecting apparatus comprising: rotating member; one or more first targets provided on said rotating member; first detecting means, disposed opposite to said first targets, for outputting a detection signal as said rotating member rotates; and second detecting means for outputting a detection signal having a phase different from that of the detection signal of said first detecting means, whereby an absolute rotational angle of said rotating member is detected on the basis of the detection signals outputted by said first detecting means and said second detecting means, comprising:

second targets, the number of which is prime to the number of said first targets, provided on said rotating member or other rotating members rotating coaxially with said rotating member;

third detecting means, disposed opposite to said second targets, for outputting a detection signal as the rotating member rotates; and fourth detecting means for outputting a detection signal having a phase different from that of the detection signal of said third detecting means; wherein the absolute rotational angle of said rotating member is detected on the basis of the detection signals outputted by said first detecting means, said second detecting means, said third detecting means and said fourth detecting means.

2. A rotational angle detecting apparatus as set forth in claim 1, wherein said first targets and said second targets are formed of convex portions provided at nearly equal intervals in the circumferential directions of said rotating members.

3. A rotational angle detecting apparatus as set forth in claim 1, wherein said first targets and said second targets are formed of non-concave portions provided between concave portions provided so that said non-concave portions are formed at nearly equal intervals in the circumferential directions of said rotating members.

4. A rotational angle detecting apparatus as set forth in claim 1, wherein said first targets and said second targets are provided with magnetic poles magnetized so as to be reversed alternately in polarity at nearly equal intervals in the circumferential directions of said rotating members.

5. A torque detecting apparatus in which:

said rotational angle detecting apparatus as set forth in claim 1 is provided for a first shaft or a second shaft connected via a connecting shaft, said first targets, said first detecting means and said second detecting means are provided for said second shaft or said first shaft, and torque applied to said first shaft is detected on the basis of the difference between the detection signal outputted by said first detecting means or said second detecting means provided for said first shaft and the detection signal outputted by said first detecting means or said second detecting means provided for said second shaft depending on torsion generating in said connecting shaft.

6. A torque detecting apparatus as set forth in claim 5, wherein said second targets provided in said rotational angle detecting apparatus are provided between said first targets provided on said first shaft and said first targets provided on said second shaft.

7. A torque detecting apparatus in which:

said rotational angle detecting apparatus as set forth in claim 2 is provided for a first shaft or a second shaft connected via a connecting shaft, said first targets, said first detecting means and said second detecting means are provided for said second shaft or said first shaft, and torque applied to said first shaft is detected on the basis of the difference between the detection signal outputted by said first detecting means or said second detecting means provided for said first shaft and the detection signal outputted by said first detecting means or said second detecting means provided for said second shaft depending on torsion generating in said connecting shaft.

8. A torque detecting apparatus as set forth in claim 7, wherein said second targets provided in said rotational angle detecting apparatus are provided between said first targets provided on said first shaft and said first targets provided on said second shaft.

9. A torque detecting apparatus in which:

said rotational angle detecting apparatus as set forth in claim 3 is provided for a first shaft or a second shaft connected via a connecting shaft, said first targets, said first detecting means and said second detecting means are provided for said second shaft or said first shaft, and torque applied to said first shaft is detected on the basis of the difference between the detection signal outputted by said first detecting means or said second detecting means provided for said first shaft and the detection signal outputted by said first detecting means or said second detecting means provided for said second shaft depending on torsion generating in said connecting shaft.

10. A torque detecting apparatus as set forth in claim 9, wherein said second targets provided in said rotational angle detecting apparatus are provided between said first targets provided on said first shaft and said first targets provided on said second shaft.

11. A torque detecting apparatus in which:

said rotational angle detecting apparatus as set forth in claim 4 is provided for a first shaft or a second shaft connected via a connecting shaft, said first targets, said first detecting means and said second detecting means are provided for said second shaft or said first shaft, and torque applied to said first shaft is detected on the basis of the difference between the detection signal outputted by said first detecting means or said second detecting means provided for said first shaft and the detection signal outputted by said first detecting means or said second detecting means provided for said second shaft depending on torsion generating in said connecting shaft.

12. A torque detecting apparatus as set forth in claim 11, wherein said second targets provided in said rotational angle detecting apparatus are provided between said first targets provided on said first shaft and said first targets provided on said second shaft.

13. A steering apparatus comprising:

a first shaft connected to a steering member:

a second shaft connected to a steering mechanism;

a connecting shaft for connecting said first shaft and said second shaft; and said torque detecting apparatus, as set forth in claim 5, for detecting steering torque applied to said first shaft on the basis of a torsional angle generating in said connecting shaft; whereby steering assisting is carried out depending on the steering torque detected by said torque detecting apparatus.

14. A steering apparatus comprising:

a first shaft connected to a steering member:

a second shaft connected to a steering mechanism;

a connecting shaft for connecting said first shaft and said second shaft; and said torque detecting apparatus, as set forth in claim 6, for detecting steering torque applied to said first shaft on the basis of a torsional angle generating in said connecting shaft; whereby steering assisting is carried out depending on the steering torque detected by said torque detecting apparatus.

15. A steering apparatus comprising:

a first shaft connected to a steering member:

a second shaft connected to a steering mechanism;

a connecting shaft for connecting said first shaft and said second shaft; and said torque detecting apparatus, as set forth in claim 7, for detecting steering torque applied to said first shaft on the basis of a torsional angle generating in said connecting shaft; whereby steering assisting is carried out depending on the steering torque detected by said torque detecting apparatus.

16. A steering apparatus comprising:

a first shaft connected to a steering member:

a second shaft connected to a steering mechanism;

a connecting shaft for connecting said first shaft and said second shaft; and said torque detecting apparatus, as set forth in claim 8, for detecting steering torque applied to said first shaft on the basis of a torsional angle generating in said connecting shaft; whereby steering assisting is carried out depending on the steering torque detected by said torque detecting apparatus.

17. A steering apparatus comprising:

a first shaft connected to a steering member:

a second shaft connected to a steering mechanism;

a connecting shaft for connecting said first shaft and said second shaft; and said torque detecting apparatus, as set forth in claim 9, for detecting steering torque applied to said first shaft on the basis of a torsional angle generating in said connecting shaft; whereby steering assisting is carried out depending on the steering torque detected by said torque detecting apparatus.

18. A steering apparatus comprising:

a first shaft connected to a steering member:

a second shaft connected to a steering mechanism;

a connecting shaft for connecting said first shaft and said second shaft; and said torque detecting apparatus, as set forth in claim 10, for detecting steering torque applied to said first shaft on the basis of a torsional angle generating in said connecting shaft; whereby steering assisting is carried out depending on the steering torque detected by said torque detecting apparatus.

19. A steering apparatus comprising:

a first shaft connected to a steering member:

a second shaft connected to a steering mechanism;

a connecting shaft for connecting said first shaft and said second shaft; and said torque detecting apparatus, as set forth in claim 11, for detecting steering torque applied to said first shaft on the basis of a torsional angle generating in said connecting shaft; whereby steering assisting is carried out depending on the steering torque detected by said torque detecting apparatus.

20. A steering apparatus comprising:

a first shaft connected to a steering member:

a second shaft connected to a steering mechanism;

a connecting shaft for connecting said first shaft and said second shaft; and said torque detecting apparatus, as set forth in claim 12, for detecting steering torque applied to said first shaft on the basis of a torsional angle generating in said connecting shaft; whereby steering assisting is carried out depending on the steering torque detected by said torque detecting apparatus.

\* \* \* \* \*